Feb. 15, 1955 M. A. RICHARDSON ET AL 2,701,945
REEL ADJUSTING MEANS FOR HARVESTING MACHINES
Filed Feb. 12, 1952 2 Sheets-Sheet 1
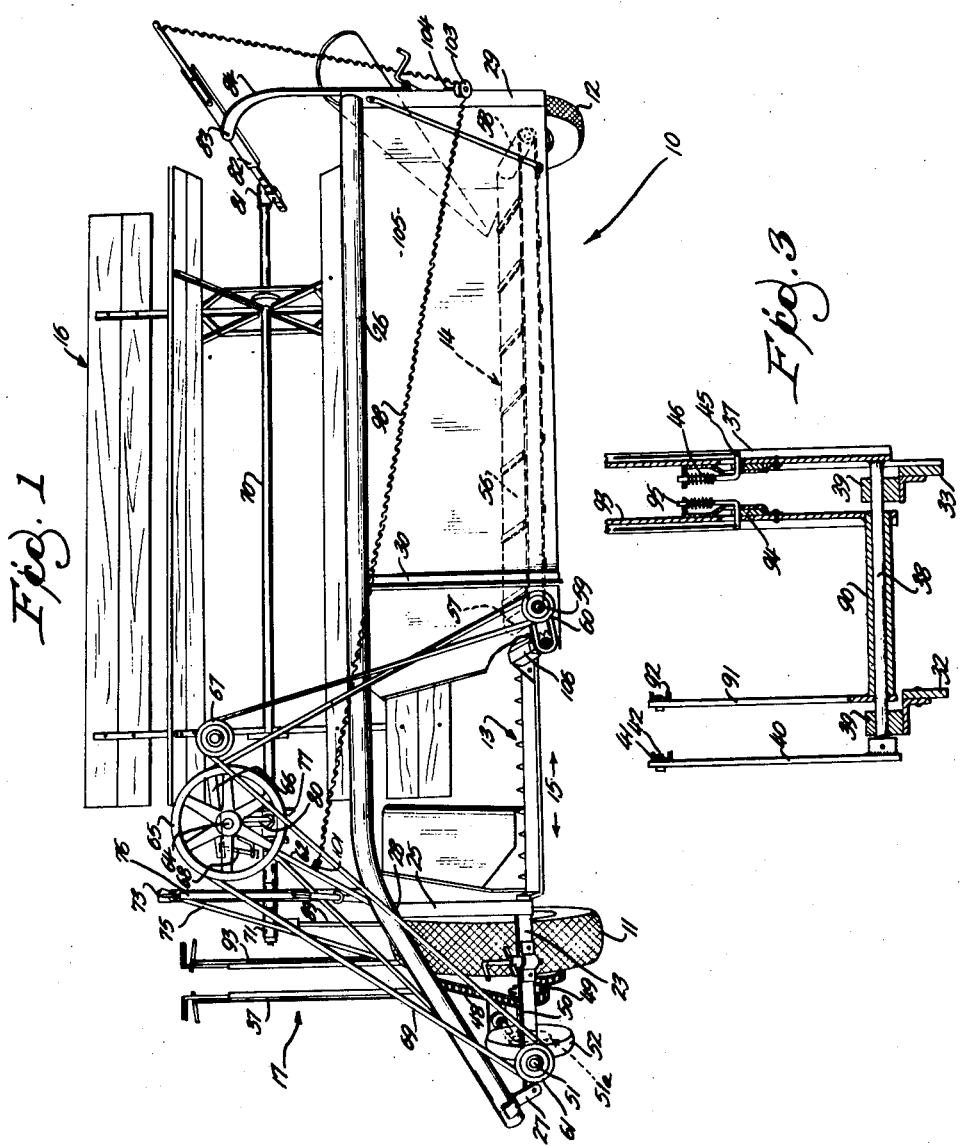
INVENTORS
PATRICK W. MORRISSEY
MARTIN A. RICHARDSON
BY
ATTORNEY

Fig. 2

United States Patent Office 2,701,945
Patented Feb. 15, 1955

2,701,945

REEL ADJUSTING MEANS FOR HARVESTING MACHINES

Martin A. Richardson and Patrick W. Morrissey, Racine, Wis., assignors to J. I. Case Company, Racine, Wis., a corporation of Wisconsin Application February 12, 1952, Serial No. 271,234

5 Claims. (Cl. 56—221)

The present invention relates to harvesting machinery such as windrowers and an object of the present invention is to generally improve the construction and operation of machines of this type. More specifically an object of the present invention is to provide an improved reel adjusting means that will support the reel in parallelism with respect to the cutting apparatus at all times. Another object is to provide an improved arrangement for swingably supporting the tilt lever and the reel adjusting lever on the drawbar of the implement in close proximity to the operator at his station on the propelling vehicle.

Further objects and advantages will become apparent from the following specification and accompanying drawings in which a satisfactory embodiment is shown. It is to be understood, however, that the invention is not limited to the exact details disclosed but includes all such variations and modifications as fall within the spirit of the invention as herein expressed.

In the drawings:

Fig. 1 is a rear elevation of a harvesting machine embodying the present invention.

Fig. 2 is an enlarged perspective view of a portion of the same taken from in front and to the left with parts removed and others broken away.

Fig. 3 is a vertical sectional view of certain structure shown in Fig. 2.

As seen in Fig. 1, a machine, generally of the type shown and described in the patent to Schroeppel, 2,410,904, comprises a frame generally designated as 10 carried by ground wheels 11 and 12, frame 10 carrying a cutter bar generally designated as 13 and a platform generally designated as 14. Platform 14 is spaced from wheel 11 to provide a delivery opening 15. Frame 10 also carries a reel 16 of any well-known or common construction commonly associated with machines of this character, and a reel adjusting means 17 is provided for supporting the reel 16 in adjusted positions with respect to the cutter bar 13 and the ground as will be more fully explained hereinafter.

Figure 2:
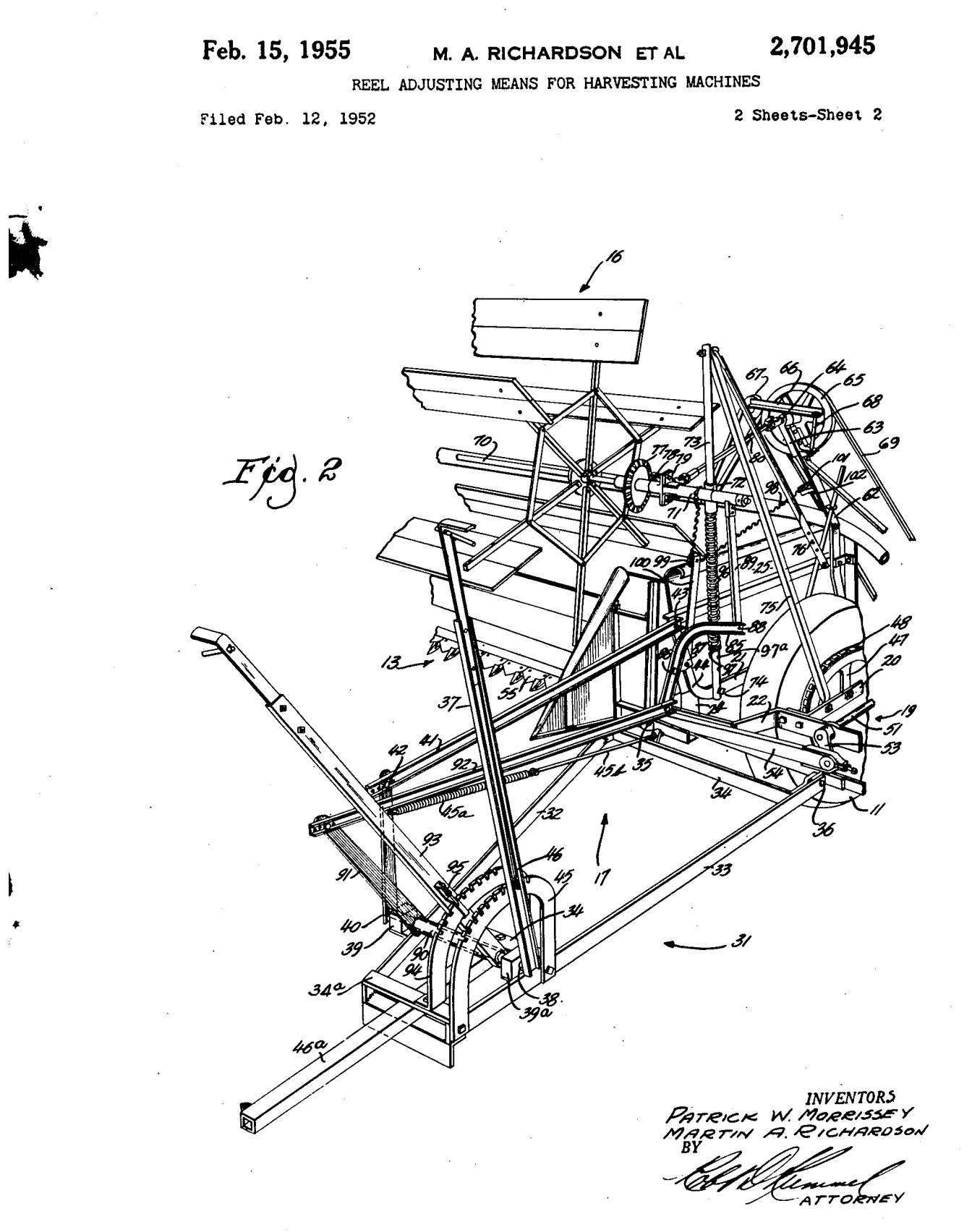

In the present instance, wheel 11 is journaled on an axle of well-known type not shown, Fig. 2, carried in a frame portion generally designated as 19 and comprising longitudinal members 20 and 21 and front and rear cross members 22 and 23, members 21 and 22 being united by a portion 24. These various frame members form a roughly rectangular frame surrounding and enclosing wheel 11 and generally disposed in a horizontal plane. Cutter bar 13 originates at the frame 19 and extends laterally of the machine at the lower front portion thereof. Between wheel 11 and platform 14 is an upstanding wall 25 connected with member 21 and serving as a part of the frame structure and also to shield wheel 11 from material being deposited through opening 15. A tubular member 26 is connected with member 23 of frame 19 preferably by a clip like element 27 and extends inwardly and upwardly to a point of connection 28 with above mentioned wall 25. Member 26 then extends across the machine substantially parallel to cutter bar 13 and unites with an end structure 29 carried in any suitable or well-known manner on wheel 12. Platform 14 is carried on structure 29, by cutter bar 13, and also by a strut 30 depending from the tubular member 26. Platform 14 is spaced appreciably from wall 25 so as to leave the before mentioned opening 15 for the deposit of the harvested material in the form of a windrow as the machine moves along.

A drawbar 31 including forwardly converging side members 32 and 33 and stabilizing end members 34 and 34a is pivoted at 35 and 36 to the forward part of the frame portion 19 and is adjustable in its angular relation therewith about a transverse axis by means of a hand lever 37 fixed to one end of a transverse rock shaft 38. The rock shaft 38 is journaled in suitable bearings 39 and 39a suitably carried on the side members 32 and 33 respectively of the drawbar, and the opposite end of the rock shaft 38 laterally of side member 32 is provided with a rock arm 40. A link 41 is pivotally secured to the rock arm 40 as at 42 and extends back to a pivotal connection 43 with an upwardly extending arch portion 44 of the member 21. The lever 37 is in cooperating relationship with a toothed quadrant member 45 fixed to the side member 33 and a detent mechanism 46 is carried on the lever 37 for maintaining the lever 37 in adjusted relation with quadrant 45 in a well-known manner and accordingly maintains the adjustment of the frame 19 relatively to drawbar 31. A counterbalance spring 45a is anchored between the rock arm 40 and a link 45b connected to the frame portion 19 for assisting the operator in the adjustment of the frame 19 relatively to the drawbar 31. A draft bar 46a is swingably connected to the front end member 34 and provides means for draft connecting the machine to a suitable propelling vehicle as well known in the art.

The several parts of the machine are actuated from the wheel 11. In the present instance a sprocket 47 fixed with the wheel drives, through a chain 48, a sprocket 49 on a shaft 50. Shaft 50 drives a shaft 51 through a pair of cooperating bevel gears of a well-known construction 51a enclosed in a housing 52, and shaft 51 carries a crank 53 engaged with a pitman 54 and connected to a sickle 55 by any well-known means, not part of the invention, and which is reciprocated in the usual manner by the rotation of the shaft 51.

Platform 14 has an apron or draper 56 traveling about rollers 57 and 58 for feeding the cut crop toward the delivery opening 15 as previously suggested. Roller 57 is fixed with a shaft 59 on which is mounted in the present instance a pulley 60. On above mentioned shaft 51 is a pulley 61 from which motion is transmitted from shaft 51 to shaft 59 as will be explained presently.

The wall 25 carries an upwardly extending standard 62 and a suitable fitting 63 is provided adjacent the upper end thereof which provides a suitable bearing for a shaft 64 on which is fixed a pulley 65. The fitting 63 also provides a fulcrum for a lever 66 on which is rotatably carried adjacent one end thereof an idler pulley 67 and adjacent the other end thereof a tension member 68 so that the pulley 67 can be raised or lowered in accordance with adjustment of tension member 68.

A belt 69 extends about pulley 61 and upwardly and over pulley 65, downwardly and about pulley 60, upwardly and over pulley 67, and again downwardly to before mentioned pulley 61. In this manner belt 69 is carried across opening 15 in such a manner as not to interfere with the disposition of the material behind the machine. Rotation of shaft 51, however, will drive shaft 59 and also pulleys 65 and 67 by virtue of movement of belt 69 caused by rotation of pulley 61.

The reel 16 is build about a central shaft 70 carried adjacent the stubble end of the reel in a bearing 71. The bearing 71 is rigidly secured as by welding or the like to a sleeve 72 and the sleeve 72 is slidably received on a standard 73 which is secured adjacent its lower end to the member 21 as by a bolt or the like 74 and stabilized in an upright position by means of stabilizing members 75 and 76 secured respectively to the frame member 20 and the side wall portion 25. The shaft 70 has a bevel gear 77 meshing with a bevel gear 78 carried in a suitable bearing portion 79 supported in the present instance on bearing 71. Bevel gear 78 is connected by a universal shaft of well-known construction and designated generally as 80 with above mentioned shaft 64. Accordingly motion of belt 69 in rotating pulley 65 will cause rotation of the reel 16.

The other end of the reel shaft 70 is supported in a bearing 81 on an arm 82, the arm 82 being fulcrumed at 83 to a curved arm or standard 84 extending upwardly and forwardly from the before mentioned structure 29.

The reel adjusting means 17 comprises a suitable rocking lever or member 85 which is fulcrumed by means of a bolt 86 to a forwardly extending bracket 87 rigidly secured to the portion 44 of frame 21. The rocking lever 85, which is in the form of a bell crank, is forwardly curved and one end or leg thereof is connected by means of a suitable pin or the like 88 to an arm 89 which is connected adjacent its other end to the bearing 71. A rock shaft 90 is journaled on the rock shaft 38 and has fixed adjacent one end thereof a rock arm 91 which is connected to the other end or leg of lever 85 by means of a link 92. The other end of rock shaft 90 has fixed thereto a hand lever 93 which is in cooperating relationship with a toothed quadrant member 94 fixed to the end members 34 and 34a so as to be adjacent quadrant member 45, and a detent mechanism 95 is carried on the lever 93 for maintaining the lever 93 in adjusted positions with respect to quadrant 94 in a well-known manner. It will be appreciated that by swinging lever 93 in a forward direction that the link 92 will pull upon member 85 so as to rock the member 85 clockwise, as viewed in Fig. 2, about fulcrum 86, this clockwise movement of member 85 permitting the sleeve 72 to slide downwardly on standard 73. The downward movement of the sleeve 72 on standard 73 consequently moves the stubble end of the reel 16 in the same direction a like distance. When the lever 93 is swung rearwardly, the arm 85 will be rocked counterclockwise or in a lifting direction and the sleeve 72 will be slid or urged upwardly on the standard 73 so as to raise the stubble end of the reel.

A coiled spring 96 encircles the standard 73 and is placed under compression between the lower end of the sleeve 72 and a pin 97 which is received in a suitable opening as 97a formed in the standard 73 for urging the reel 17 upwardly sufficiently to substantially counterbalance the reel and aid the operator in moving the reel into adjusted positions.

The rearward end of the arm 82, Fig. 1, is connected to the stubble end of the reel by means of a chain 98 as will now be explained. The chain 98 is suitably connected to the bearing 71, Fig. 2, and is downwardly trained around a pulley 99 which is carried by a suitable standard 100 extending upwardly from the side wall 25. The chain 98 travels rearwardly from the pulley 99 and is trained around a pulley 101 carried by a suitable bracket 102 fixed to the standard 62, and the chain 98 after leaving the pulley 101 travels laterally substantially parallel with the frame member 26 and is trained around another pulley 103, Fig. 1, which is suitably carried by a bracket 104 fixed to the end portion 29. The chain extends upwardly from the pulley 103 and is suitably connected to the reel supporting member 82 adjacent the rearward end thereof. It will be appreciated that the chain 98 moves the grain end of the reel 16 in the same direction and the same distance as the stubble end of the reel is moved so that the reel remains in parallelism with the cutter bar 13 at all times. More specifically when the stubble end of the reel 16 is moved into a raised position, the chain 98 is placed in tension and the arm 82 is rocked upwardly about fulcrum 83 sufficiently to maintain the reel 16 in parallelism with respect to cutter bar 13. When the stubble end of the reel 16 is permitted to move into a lowered position, the chain 98 becomes slack and the weight of the reel 16 rocks the arm 82 downwardly about fulcrum 83 to the extent allowed by the slackness of chain 98. As before mentioned, the length of chain 98 is so determined as to maintain the reel 16 in parallelism with respect to the cutter bar 13 when the reel 16 is moved into various adjusted positions.

A wind shield 105 is arranged behind the platform 14 and attached to structure 29 and strut 30, and a roller 06 is rotatably carried adjacent roll 57 and drivingly connected thereto for assisting the discharge of material from apron 56 into the opening 15 as is well known in the art.

Having now described the present invention, what I claim is:

1. A reel adjusting means for use with a harvesting machine of the type having a wheeled carriage having a stubble end, a forwardly extending drawbar connected to said wheeled carriage adjacent the stubble end thereof, and a reel rotatably carried by the carriage, said reel including a stubble end and a grain end, the stubble end of the reel being supported for vertical slidable movement with respect to said carriage, said reel adjusting means including a swingable member fulcrumed to said carriage about a transverse axis and positioned adjacent the stubble end of said reel, an arm connecting the stubble end of said reel to one end of said swingable member for vertically slidably moving said reel with respect to said carriage upon said swingable member's being rocked, a rock shaft carried on said drawbar and capable of being rocked into adjusted positions about a transverse axis, a link between said rock shaft and the other end of said swingable member for rocking said swingable member upon the link's being oscillated by said rock shaft, and a chain connection between the grain end of said reel and the stubble end of said reel for effecting vertical movement of said reel in parallelism with respect to the ground upon said swingable member's being rocked.

2. A reel adjusting means for use with a harvesting machine of the type having a wheeled carriage having a stubble end, a forwardly extending drawbar connected to said wheeled carriage adjacent the stubble end thereof, an upwardly extending standard supported by said carriage adjacent the stubble end thereof, and a reel rotatably carried by the carriage, said reel having a stubble end and a grain end, the stubble end of the reel being supported for substantially vertical sliding movement on said standard, said reel adjusting means including a bell crank carried by said carriage adjacent the stubble end of said reel and swingable about a transverse axis, an arm connecting the stubble end of said reel to one leg of said bell crank for vertically moving the stubble end of said reel on said standard upon said bell crank's being rocked, a rock shaft carried on said drawbar and capable of being rocked into adjusted positions about a transverse axis, a link between said rock shaft and the other leg of said bell crank for rocking said bell crank upon the link's being oscillated by said rock shaft, and a chain connection between the grain end of said reel and the stubble end of said reel for effecting vertical movement of said reel in parallelism with respect to the ground upon said bell crank's being rocked.

3. In a harvesting machine of the type having a wheeled carriage having a stubble end and a grain end, a drawbar connected to the carriage and extending forwardly therefrom adjacent the stubble end thereof, a reel supporting arm adjacent the grain end of said carriage and fulcrumed for up and down swinging movement, an upwardly extending standard carried adjacent the stubble end of said carriage, and a reel built about a central shaft rotatably carried between said reel supporting arm and said upwardly extending standard, said central shaft having a grain end and a stubble end and said shaft being slidably supported on said upwardly extending standard for up-and-down adjusted movement, a reel adjusting means for positioning said reel in adjusted positions with respect to the ground and in parallelism with respect thereto, said reel adjusting means comprising a swingable member carried by said carriage adjacent said upwardly extending standard, an arm connecting the stubble end of said central shaft to one end of said swingable member for slidably moving said central shaft on said upwardly extending standard upon rocking of said swingable member, a rock shaft on said drawbar capable of being rocked into various adjusted positions, a link between said rock shaft and the other end of said swingable member for rocking said swingable member upon the link's being oscillated in either direction, and a chain between the rearward end of said reel supporting arm and said central shaft adjacent the stubble end thereof for effecting a movement of the grain end of the central shaft in accordance with movement of the stubble end of the central shaft in the same direction and a like distance for maintaining the reel in parallelism with respect to the ground.

4. In a harvesting machine of the type having a wheeled carriage having a grain end and a stubble end, a drawbar connected to the carriage and extending forwardly therefrom adjacent the stubble end thereof, a reel supporting arm adjacent the grain end of said carriage and fulcrumed for up and down swinging movement, an upwardly extending standard carried adjacent the stubble end of said carriage, and a reel built about a central shaft, said shaft having a grain end and a stubble end, the grain end of the shaft being rotatably supported on said reel supporting arm, a sleeve rotatably supported adjacent the stubble end of said shaft, said sleeve being slidably received by said upwardly extending standard, a reel adjusting means for positioning said reel in adjusted positions with respect to the ground and in parallelism with respect thereto, said reel adjusting means comprising a bell crank carried by said carriage adjacent said upwardly extending standard, an arm connecting the stubble end of said central shaft to one end of said bell crank for slidably moving said central shaft on said upwardly extending standard in response to said bell crank's being rocked, a rock shaft on said drawbar capable of being rocked into adjusted positions, a link between said rock shaft and the other end of said bell crank for rocking said bell crank upon said link's being oscillated by said rock shaft, and a chain connection between the stubble end of said central shaft and the reel supporting arm adjacent the rearward end thereof for adjusting the grain end of the reel in accordance with adjustment of the stubble end in the same direction and a like distance for maintaining the reel in parallelism with respect to the ground.

5. In a harvesting machine of the type having a wheeled carriage having a grain end and a stubble end, a drawbar connected to the carriage and extending forwardly therefrom adjacent the stubble end thereof, a reel supporting arm adjacent the grain end of said carriage and fulcrumed for up and down swinging movement, an upwardly extending standard carried adjacent the stubble end of said carriage, and a reel built about a central shaft, said shaft having a grain end and a stubble end, the grain end of the shaft being rotatably supported on said reel supporting arm, a sleeve rotatably supported adjacent the stubble end of said shaft, said sleeve being slidably received by said upwardly extending standard, a reel adjusting means for positioning said reel in adjusted positions with respect to the ground and in parallelism with respect thereto, said reel adjusting means comprising a bell crank carried by said carriage adjacent said upwardly extending standard, an arm connecting the stubble end of said central shaft to one end of said bell crank for slidably moving said central shaft on said upwardly extending standard in response to said bell crank's being rocked, a rock shaft on said drawbar capable of being rocked into adjusted positions, a link between said rock shaft and the other end of said bell crank for rocking said bell crank upon said link's being oscillated by said rock shaft, a spring encircling said standard and placed in compression by said sleeve for assisting in moving the stubble end of said shaft in an upward direction, and a chain connection between the stubble end of said central shaft and the reel supporting arm adjacent the rearward end thereof for adjusting the grain end of the reel in accordance with adjustment of the stubble end in the same direction and a like distance for maintaining the reel in parallelism with respect to the ground.

References Cited in the file of this patent

UNITED STATES PATENTS

| | | |
|---|---|---|
| 598,652 | Appleby | Feb. 8, 1898 |
| 1,085,299 | Riley et al. | Jan. 27, 1914 |
| 1,449,350 | Ried | Mar. 20, 1923 |
| 2,226,563 | Keith | Dec. 31, 1940 |
| 2,501,424 | Ufer | Mar. 21, 1950 |

FOREIGN PATENTS

| | | |
|---|---|---|
| 54,752 | Netherlands | June 15, 1943 |